(12) United States Patent
Liu

(10) Patent No.: US 12,210,884 B2
(45) Date of Patent: Jan. 28, 2025

(54) PROCESSING METHOD AND PROCESSING DEVICE

(71) Applicant: Lenovo (Beijing) Limited, Beijing (CN)

(72) Inventor: Haibin Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 88 days.

(21) Appl. No.: 18/312,098

(22) Filed: May 4, 2023

(65) Prior Publication Data
US 2024/0004673 A1  Jan. 4, 2024

(30) Foreign Application Priority Data
Jun. 30, 2022  (CN) .......................... 202210776398.2

(51) Int. Cl.
G06F 9/00 (2018.01)
G06F 8/65 (2018.01)
G06F 9/4401 (2018.01)
G06F 9/445 (2018.01)

(52) U.S. Cl.
CPC ............ *G06F 9/44505* (2013.01); *G06F 8/65* (2013.01); *G06F 9/4401* (2013.01)

(58) Field of Classification Search
None
See application file for complete search history.

(56) References Cited

U.S. PATENT DOCUMENTS

| | | | | |
|---|---|---|---|---|
| 5,854,905 A | * | 12/1998 | Garney | G06F 9/4406 710/104 |
| 2006/0069949 A1 | * | 3/2006 | Hayakawa | G06F 11/006 714/E11.019 |
| 2020/0176071 A1 | * | 6/2020 | Ng | G06F 11/2284 |

* cited by examiner

*Primary Examiner* — Nitin C Patel
(74) *Attorney, Agent, or Firm* — ANOVA LAW GROUP, PLLC

(57) ABSTRACT

A processing method includes responding to a trigger condition being satisfied, starting a first application, and controlling the first application to perform a target operation corresponding to a target request to implement a first function different from a second function. The first application runs in a pre-operating system environment. The second function includes a function for initializing the pre-operating system environment. Data used to implement the first function and the second function is stored in different storage locations.

20 Claims, 4 Drawing Sheets

---

S101 — In response to satisfying a trigger condition, start a first application, the first application being an application running in a pre-operating system (Pre-OS) environment S102 — Control the first application to execute a target operation corresponding to a target request to realize a first function different from a second function, the second function at least including a function of initializing the Pre-OS environment, first data that being at least used to implement the first function is stored in a location different from a location where second data used to implement the second function is stored

PROCESSING METHOD AND PROCESSING DEVICE

CROSS-REFERENCE TO RELATED APPLICATION

This application claims priority to Chinese Patent Application No. 202210776398.2, filed on Jun. 30, 2022, the entire content of which is incorporated herein by reference.

TECHNICAL FIELD

The present disclosure relates to the processing field and, more particularly, to a processing method and a processing device.

BACKGROUND

After an electronic apparatus is powered on, a Basic Input Output System (BIOS) is started. The BIOS implements hardware self-check and initialization of the electronic apparatus. In addition, the BIOS can also realize other functions that are non-core functions (auxiliary functions), such as setting a boot password and upgrading the BIOS version. At present, all the functions are realized by the BIOS, which increases the processing burden of the BIOS.

SUMMARY

Embodiments of the present disclosure provide a processing method. The method includes responding to a trigger condition being satisfied, starting a first application, and controlling the first application to perform a target operation corresponding to a target request to implement a first function different from a second function. The first application runs in a pre-operating system environment. The second function includes a function for initializing the pre-operating system environment. Data used to implement the first function and the second function is stored in different storage locations.

Embodiments of the present disclosure provide a processing device, including a start unit and a control unit. The start unit is configured to respond to satisfying a trigger condition and start a first application. The first application is an application running in a pre-operation system environment. The control unit is configured to control the first application to perform a target operation corresponding to a target request to implement a first function different from a second function. The second function includes a function of initializing the pre-operating system environment. Data used to implement the first function and the second function is stored in different locations.

Embodiments of the present disclosure provide an electronic apparatus, including a processor and a memory. The memory stores a computer program that, when executed by the processor, causes the processor to respond to a trigger condition being satisfied, start a first application, and control the first application to perform a target operation corresponding to a target request to implement a first function different from a second function. The first application runs in a pre-operating system environment. The second function includes a function for initializing the pre-operating system environment. Data used to implement the first function and the second function is stored in different storage locations.

DETAILED DESCRIPTION OF THE EMBODIMENTS

To make the objectives, features, and advantages of the present disclosure more obvious, the technical solutions of embodiments of the present disclosure are described in detail below with reference to the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

If hardware self-check and initialization are regarded as core functions of a Basic Input Output System (BIOS equivalent to UEFI), other functions that can be implemented by the BIOS besides the core functions can be regarded as non-core functions or auxiliary functions. The non-core functions or auxiliary functions can include but are not limited to password setting, BIOS setting interface, mode setting of an electronic apparatus, configuration of related members and drivers of the electronic apparatus, firmware version upgrading, and system time modification of the electronic apparatus. In practical applications, any functions that can be implemented by the BIOS other than the hardware self-check and initialization functions can be regarded as auxiliary functions, which are not limited by embodiments of the present disclosure.

The above functions of the BIOS can be implemented by a BIOS program solidified on a storage component of a motherboard of the electronic apparatus, such as a Read-Only Memory (ROM). On one hand, the core and non-core functions are realized by the BIOS, which increases the processing burden of the BIOS. On another hand, the BIOS program for implementing the core and non-core functions is stored in the ROM, which occupies the storage space of the BIOS and increases the cost of the electronic apparatus.

Figure 1:
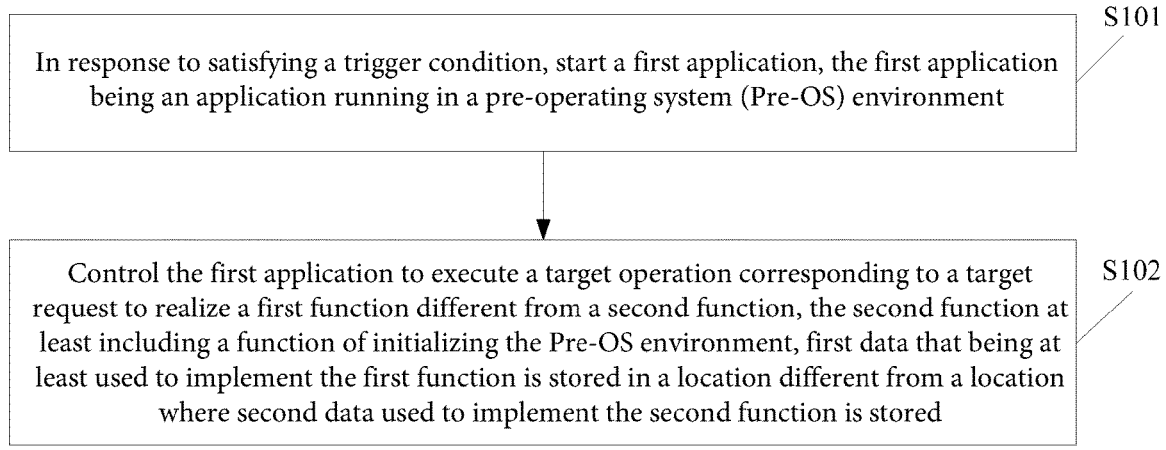
FIG. 1 illustrates a schematic flowchart of a processing method according to some embodiments of the present disclosure.

FIG. 1 illustrates a schematic flowchart of a processing method according to some embodiments of the present disclosure. The method includes the following processes.

At S101, in response to satisfying a trigger condition, a first application is started, and the first application is an application running in a pre-operating system (Pre-OS) environment.

In some embodiments, a first function can be implemented by the first application. The first application can be an application running in the Pre-OS environment. The first application can be an existing application. The first function can be implemented by the existing application. The first application can also be an application that is additionally provided and used to implement the first function.

A plurality of non-core functions can be provided. To implement the plurality of non-core functions, a plurality of first applications can be provided. Each first application can be used to implement one function of the plurality of non-core functions. In some embodiments, each first function can correspond to a first application. When a certain non-core function of the plurality of non-core functions needs to be implemented, whether the first application corresponding to the non-core function that needs to be implemented is started can be determined based on determining whether the trigger condition is satisfied. If the trigger condition is satisfied, in response to the trigger condition, the first application corresponding to the non-core function that needs to be implemented can be started.

In some embodiments, one first application can be provided. The first application can be regarded as a composite application that can be used to implement the plurality of non-core functions. To implement the plurality of non-core functions by the same application (the first application), the first application can display an interface. The interface can include option information for implementing different non-core functions. Different non-core functions can be implemented based on an operation of different pieces of option information.

In the present disclosure, the first application can be started based on the trigger condition. Further, the trigger condition can be preset. The first application can be triggered to start when the trigger condition is satisfied. The trigger condition can be any condition that can be used to trigger the first application to start. One or more trigger conditions can be provided. When only one trigger condition of the plurality of trigger conditions is satisfied, the first application can be triggered to start.

A Pre-OS can be a system that runs in the electronic apparatus before, during, or after the operating system, such as an operating system, of the electronic apparatus. Since the BIOS can run before the operating system of the electronic apparatus, such as an operating system of Windows family, Linux, etc., a Pre-OS environment can be a system environment in a BIOS or UEFI stage. The first application of the present disclosure can be an application running in a BIOS or UEFI environment.

At S102, the first application is controlled to execute a target operation corresponding to a target request to realize a first function different from a second function. The second function at least includes a function of initializing the Pre-OS environment. First data that is at least used to implement the first function is stored in a location different from a location where second data used to implement the second function is stored.

In some embodiments, the second function can be a core function of the BIOS. The core function can include the above hardware self-check and initialization function, which includes processes of powering on, initialization, reporting a hardware state, and loading a bootloader (boot program).

When the first application is used to implement the first function, program codes of the first application may need to be used to implement the first function. Starting and running the first application can be supported by certain program codes. Based on this, the first data used to implement the first function of the present disclosure can include the program codes of the first application, the program codes for supporting or implementing the starting and running of the first application, and program codes for implementing the non-core function.

The second data can be regarded as program codes for implementing the core function of the BIOS. In the present disclosure, the second data can be stored in the electronic apparatus. In some embodiments, the second data can be stored in a ROM arranged in the motherboard. The first data can be stored in a mobile device. The electronic apparatus or the ROM of the electronic apparatus can be regarded as a storage location of the second data, and the mobile device can be regarded as a storage location of the first data. Thus, the storage locations of the first data for implementing the first function and the second data for implementing the second function can be different.

The first application can also be installed in the mobile device that is different from the electronic apparatus. When the first application is installed in the mobile device, the first data can be stored in the mobile device, and the second data can be stored in the electronic apparatus. In response to satisfying the trigger condition, the electronic apparatus can start the first application installed in the mobile device and control the first application to perform a target operation corresponding to the target request to implement the non-core function of the BIOS. Thus, processing logic of processes S101 and S102 can be deployed in the electronic apparatus.

In some embodiments, the non-core function of the BIOS can be implemented by the first application. The core function of the BIOS can be implemented by the BIOS. Compared with the solution that the non-core function and the core function of the BIOS are implemented by the BIOS, the processing burden of the BIOS can be effectively reduced. When the non-core function of the BIOS needs to be used, the first application can be started and used to implement the non-core function when the trigger condition is satisfied. The method can be easy to implement and reliable.

If the first data and the second data are stored in the storage space ROM of the BIOS program, a large amount of BIOS storage space can be occupied. To reduce the occupation of the BIOS storage space and reduce the burden of the ROM, the second data can be maintained in an original storage location and stored in the ROM of the electronic apparatus, while the first data can be stored in a storage location different from the ROM of the electronic apparatus. For example, the first data can be stored in the mobile device. The mobile device can be an apparatus including a ROM, a hard drive, and a flash drive. The mobile device can include a ROM, a hard drive, and a flash drive. By storing the first data used to implement the non-core function in an external apparatus (the mobile device), the occupation of the storage space of the BIOS can be reduced, and the cost of the electronic apparatus can be reduced.

To exclusively occupy the ROM of the electronic apparatus by the BIOS program for implementing the core function of the BIOS, the first data for implementing the non-core function of the BIOS may need to be stored in the external apparatus. Thus, the first data and the second data for implementing two different types of functions can be stored separately. When one type of data is used, the other type of data may not be influenced, and the independability of the two types of data can be good.

The target request can be a request for implementing the non-core function of the BIOS. The target request can include but is not limited to a request used to request a BIOS update, restoration, or configuration, a request used to start a diagnosis, monitoring, and/or a recovery tool, a request used to download an application, a request used to download firmware, a request used to request for performing interface coordination, a request used to deploy BIOS services, a request used to recycle the electronic apparatus, and a request used to modify a BIOS configuration item. Correspondingly, the target operation can include but is not limited to performing an operation of updating, recovering, or configuring the BIOS, starting the diagnosis, monitoring, and/or recovering tool, performing the diagnosis, monitoring, and/or recovering operation based on the started tool, performing an application download operation, performing a firmware download operation, performing an interface coordination operation, performing a deployment operation, performing a recycling operation, and modifying the BIOS configuration items.

Based on this, the first function can include but is not limited to, a function of updating, recovering, or configuring the BIOS, a function of diagnosing whether an error occurs in a hard drive or a memory (a failure processing function), a function of monitoring machine performance parameters (a fault handling function), a function of recovering from abnormal to normal (a failure handling function), a software and hardware updating or coordination function such as an application downloading function, a firmware downloading function, or an interface coordination function, a deployment function, a recycling function, and a BIOS configuration modification function.

In processes S101 and S102, the non-core function of the BIOS can be implemented by controlling the first application running in the BIOS environment. Further, the non-core function of the BIOS can be implemented by performing a target operation on the first application. The core function of the BIOS can be implemented, while the non-core function of the BIOS can be implemented using the first application. Thus, the normal application of the core function and the non-core function of the BIOS cannot be influenced. In addition, the second data used to implement the core function of the BIOS and the first data used to implement the non-core function can be stored separately to maintain independence between the first data and the second data. The first data of the non-core function can be removed from the storage space of the BIOS and stored in another storage location, which greatly reduces the occupation of the storage space of the BIOS.

The electronic apparatus of embodiments of the present disclosure can include but is not limited to, a terminal or a server. The terminal can include but is not limited to, a cell phone, a tablet computer, an all-in-one machine, a desktop computer, a smart sound box, and a smartwatch. The server can include a general server and a cloud server. The mobile device can be a mobile terminal or a server, such as a cell phone, a tablet computer, and a smartwatch.

An execution subject of processes S101 to S102 can be the electronic apparatus. In some embodiments, the first application can be installed in the mobile device. The first data can be stored in the mobile device. The second data can be stored in the electronic apparatus. The electronic apparatus can start the first application installed in the mobile device in response to satisfying the trigger conduction and control the first application to perform the target operation corresponding to the target request to implement the non-core function of the BIOS. Thus, the non-core function of the BIOS can be implemented by the first application.

According to embodiments of the present disclosure, the non-core function of the BIOS can be implemented using the first application, which does not affect the normal application of the non-core function of the BIOS. The core function of the BIOS can be implemented when the electronic apparatus enters the BIOS phase. Technical support can be provided to the core function and the non-core function of the BIOS.

Figure 2:
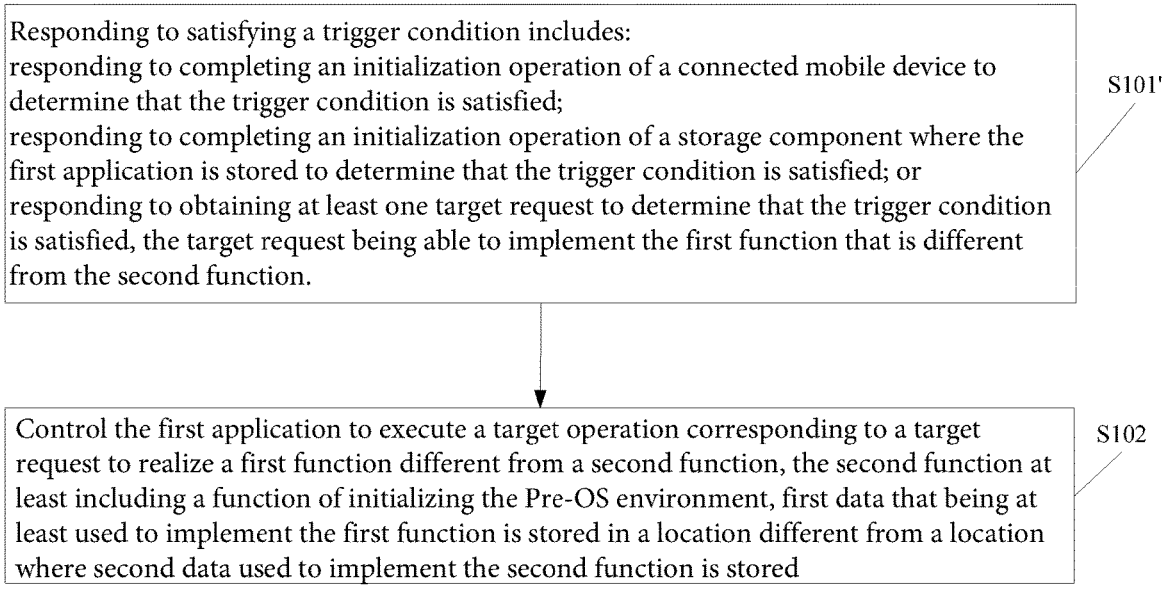
FIG. 2 illustrates a schematic flowchart of a processing method according to some embodiments of the present disclosure.

In embodiments of the present disclosure, as shown in FIG. 2, process S101 is shown as S101', responding to satisfying a trigger condition includes at least one of the following processes.

(1) In response to completing an initialization operation for an connected mobile device, the trigger condition is determined to be satisfied.

The mobile device can include an apparatus with an encryption function or without the encryption function. When the mobile device is an apparatus with the encryption function, the mobile device may include a mobile storage drive, such as a Flash drive, a mobile hard disk, or an apparatus having a storage function. When the apparatus has the encryption function, completing the initialization operation for the connected mobile device can include successfully decrypting the mobile device by the electronic apparatus.

When the mobile device is an apparatus without the encryption function, completing the initialization operation of the connected mobile device can include completing building a communicative connection between the mobile device and the electronic apparatus, or completing building the communicative connection between the mobile device and the electronic apparatus and passing authorization of the electronic apparatus on the mobile device.

The electronic apparatus can determine that the trigger condition is satisfied in response to completing an initialization operation for the connected mobile device. The electronic apparatus can start the first application installed in the mobile device, control the first application to run, and control the first application to perform the target operation corresponding to the target request to implement the first function. Thus, the execution subject of the logic of the method of the present disclosure can be the electronic apparatus.

(2) The trigger condition is determined to be satisfied in response to completing the initialization operation of the storage component where the first application is located.

When the first application is installed in the mobile device, the storage component where the first application is installed can be the mobile device. In the BIOS stage of the electronic apparatus, the electronic apparatus can perform self-check and initialization on the hardware of the electronic apparatus and on the storage component of the first application access to the electronic apparatus. When the self-check and initialization are completed, the electronic apparatus can determine that the trigger condition is satisfied. In response to satisfying the trigger condition, the electronic apparatus starts the first application in the mobile device and control the first application to perform the target operation corresponding to the target request to implement the non-core function of the BIOS.

(3) The target request is able to implement the first function that is different from the second function.

In some embodiments, a large number of target requests are included. At least one target request of the target requests can be generated. In response to the generated target request, the electronic apparatus can determine that the trigger condition is satisfied to start the first application.

The target request can be the request above. The target request can further include but is not limited to a request for rental management, a request for resource management, a request for performing security processing (e.g., encryption, security authentication) of the data, and other requests that require customized services.

In embodiments of the present disclosure, the first application of the present disclosure can be started based on a certain trigger condition, which can avoid the problem caused by a false start. Thus, the practical application of the non-core function of the BIOS can be improved.

In some embodiments, the target request of the present disclosure can include but is not limited to, at least one of the following requests.

A request for updating, restoring, or configuring a basic input system of the electronic apparatus can be included. For example, the request can include performing version updating and restoration on the BIOS, reconfiguring a system time of the electronic apparatus in the BIOS, and controlling on/off of the input and output apparatus of the electronic apparatus.

A request for performing fault processing on the electronic apparatus can be included. For example, the request can include processing an error of a central processing unit (CPU) or a hard drive of the electronic apparatus and recovering from a black screen non-starting state to a normal state of the electronic apparatus.

A request for updating or repairing the software and hardware of the electronic apparatus can be included. For example, the request can include updating or repairing software in the operating system of the electronic apparatus and repairing hardware of the electronic apparatus.

A request for rental management or resource management of the electronic apparatus can be included. For example, the request can include storing or updating the accounts and passwords of all users using the electronic apparatus, or storing or updating data that needs to be kept confidential of appropriate users such as accounts and passwords assigned to the appropriate users for logging in a certain system or platform, or storing or updating data generated in a renting process, such as information of expenses, renting time, and renting units generated by renting a factory building.

A request for performing security processing on interactive data of the electronic apparatus can be included. For example, the request can include performing encryption on important data generated by the electronic apparatus, then storing the encrypted data, and allowing the data to be used after the password is authenticated until the data needs to be used.

A request for the electronic apparatus to output a customized service can be included, which is a request for realizing a personalized request of the user. For example, the request can include requiring the BIOS password to be entered before entering the BIOS set by the user in the BIOS configuration information. For example, when the mobile device installed with the first application is decrypted, the electronic apparatus can be allowed to start the first application.

If the above requests are regarded as various types of requests, a plurality of first applications can be included. Each first application can be used to realize a first function corresponding to a certain request of the various types of requests. When one request of the plurality of requests satisfies the trigger condition, the first application of the first function corresponding to the type of request can be started from the plurality of first applications.

In some embodiments, if the request for updating, restoring, or configuring the BIOS of the electronic apparatus is generated, a first application capable of updating, restoring, or configuring the BIOS can be started from the plurality of first applications.

In embodiments of the present disclosure, the first application can be used to implement a plurality of non-core functions of the BIOS. By implementing the non-core functions of the BIOS based on controlling the first application, the occupation of the BIOS storage space can be avoided, and the resource burden can be reduced. The non-core functions of the BIOS can be normally implemented.

The above various types of requests cannot be listed one by one, and any reasonable requests are within the scope of the present disclosure.

The target request can include various types of requests obtained after the electronic apparatus is powered on or a request obtained after the electronic apparatus enters the operating system.

Corresponding to the various types of target requests, executable target operations and implementable first functions can be described as follows.

The target operation of updating, recovering, or configuring the basic input system of the electronic apparatus can be performed to realize the function of updating, recovering, or configuring the BIOS.

The target operation of fault processing can be performed to realize the function of fault processing.

The target operation of updating or repairing the software and the hardware of the electronic apparatus can be performed to realize the function of updating or repairing the software and the hardware.

The target operation of rental management or resource management can be performed on the electronic apparatus to realize the function of the rental management or resource management.

The target operation of security processing of the interaction data of the electronic apparatus can be performed to realize the function of the security processing of the interaction data of the electronic apparatus.

The customized target operation can be performed to realize the customized function.

In embodiments of the present disclosure, based on different target requests, various types of target operations can be provided to realize different functions. The non-core function of the BIOS of the present disclosure can have richness and diversity.

In some embodiments, the non-core function such as updating, recovering, or configuring the BIOS of the electronic apparatus can be functions that need to be implemented in cooperation with the BIOS. In some application scenarios, the functions such as the fault processing of the electronic apparatus, updating or repairing software and hardware of the electronic apparatus, the rental management or resource management of the electronic apparatus, the security processing of interaction data of the electronic apparatus, and outputting the customized service to the electronic apparatus can be functions that can be realized without the cooperation with the BIOS.

Figure 3:
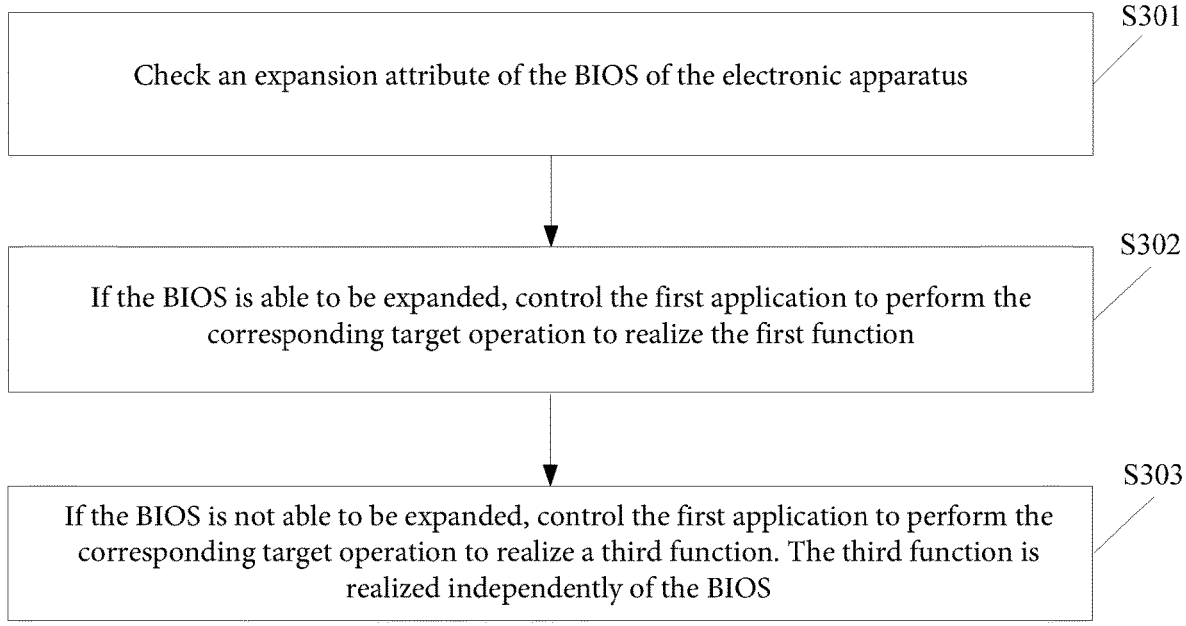
FIG. 3 illustrates a schematic flowchart of a processing method according to some embodiments of the present disclosure.

In some embodiments, as shown in FIG. 3, the method further includes the following processes.

At S301, an expansion attribute of the BIOS of the electronic apparatus is checked.

In this step, whether the BIOS of the electronic apparatus supports functional extension can be detected. From a technical perspective, whether the BIOS supports the interaction with the first application can be detected.

At S302, if the BIOS is able to be expanded, the first application is controlled to perform the corresponding target operation to realize the first function.

If the BIOS can support the interaction with the first application, the BIOS can support the functional extension. The first application can be controlled to perform the corresponding target operation to realize the function that requires cooperation with the BIOS.

At S303, if the BIOS is not able to be expanded, the first application is controlled to perform the corresponding target operation to realize a third function. The third function is realized independently of the BIOS.

If the BIOS does not support the interaction with the first application, the BIOS cannot support the functional extension. The first application can be controlled to perform the corresponding target operation to realize the function that can be realized without cooperation with the BIOS.

In processes S301 to S303, when the BIOS supports the extension, the function that can be realized with the cooperation with the BIOS can be realized by controlling the first application. When the BIOS does not support the extension, the functions of the non-core functions of the BIOS that can be realized without cooperation with the BIOS can be realized by controlling the first application. In some embodiments, based on whether the BIOS can be extended, the function requiring cooperation with the BIOS and the function without cooperation with the BIOS can be normally realized.

Figure 4:
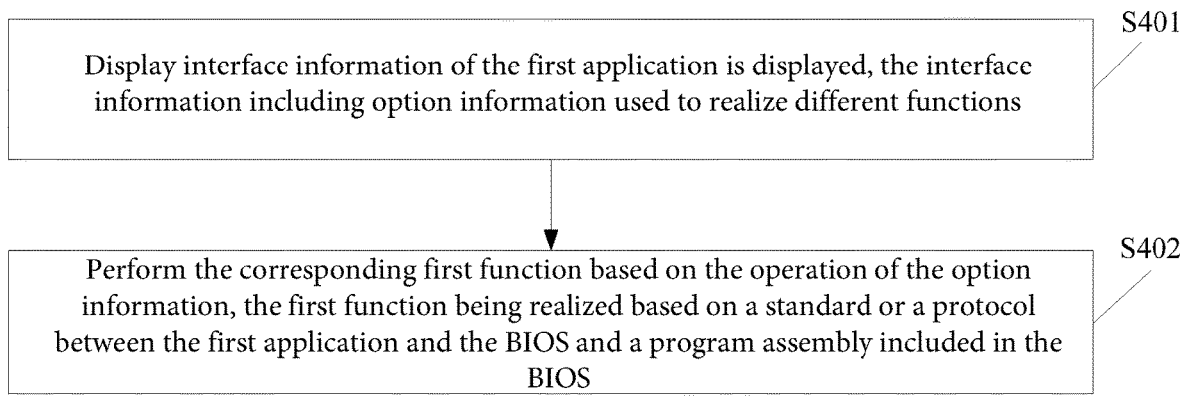
FIG. 4 illustrates a schematic flowchart of a processing method according to some embodiments of the present disclosure.

In some embodiments, as shown in FIG. 4, controlling the first application to perform the target operation corresponding to the target request to realize the first function includes the following processes.

At S401, interface information of the first application is displayed. The interface information includes option information used to realize different functions.

For example, one first application can be included. When the electronic apparatus starts the first application, the interface information of the first application can be displayed. The interface information can include option information such as an icon that is able to realize different functions.

In some embodiments, the icon can include an icon for realizing the function of updating, recovering, or configuring the BIOS, an icon for realizing the fault handling function, an icon for realizing the function of updating or repairing software and hardware, an icon for performing the security processing on the interaction data, and an icon for realizing the customized service.

The icons can be sequentially displayed in the interface of the first application in a certain order. For example, the icons can be displayed from top to bottom or from top to bottom. In some other embodiments, the icons can be displayed according to different levels. Each level can display an icon. A partial shielding part can exist between levels. A multi-functional icon set for the function of updating, recovering, or configuring the BIOS can be displayed in a multi-level folding mode. For example, an icon of a first level can be a multi-functional icon for providing the function of updating, recovering, or configuring the BIOS. After the user selects the icon, an icon of a second level can be displayed. The icon of the second level can include three sub-icons, which can be used to realize the functions of updating, recovering, or configuring the BIOS in sequence, for the user to select.

At S402, the corresponding first function is performed based on the operation of the option information. The first function is realized based on a standard or a protocol between the first application and the BIOS and a program assembly included in the BIOS.

The electronic apparatus can receive an operation of the user for selecting the icon. The function corresponding to the selected icon can be realized. Based on the standard or protocol between the first application and the BIOS, the electronic apparatus can call the program assembly of the BIOS of the first function and the program codes (first data) stored in the mobile device. The program assembly can be used to run the program codes to realize the first function.

The standard or protocol between the first application and the BIOS can include a standard or protocol supported between the first application and the BIOS. The standard or protocol can include an industry standard or vendor standard, a specification in an IFID (domain) of the BIOS domain, an ODR (Vendor) specification, or an FWTAG specification (a domain conventional specification) in FIG. 5.

In processes S401 and S402, the function can be selected based on the interface information of the first application. The non-core function of the BIOS can be realized with the support of the standard or protocol between the first application and the BIOS. The non-core function of the BIOS provided externally can be visually displayed through the interface, which improves the user experience. Based on the protocol or standard, the program assembly of the BIOS can ensure that the non-core function of the BIOS can be smoothly realized.

In some embodiments, performing the corresponding first function based on the operation on the option information includes at least one of the following processes.

If the operation is an operation for a file option, a functional operation of downloading or upgrading at least one of an application, firmware, and a driver can be performed. For example, in the interface displayed by the first application, a selected operation can be performed on the application, firmware, and the file of the driver that needs to be downloaded or upgraded. Thus, the function of downloading or upgrading the application, the firmware, and the driver can be realized.

If the operation is the operation for an resource management option or a rental management option of the electronic apparatus, the interface information used to perform the resource management or rental management can be output. For example, in the interface displayed by the first application, the selection operation can be performed on the resource management option or the rental management option, and the interface information used to perform the resource management or rental management can be output, e.g., displaying an interface for editing the resource information or rental information. In the interface, operations of adding, deleting, and changing the resource information or the rental information can be performed.

If the operation is an operation of triggering the setting of the BIOS, at least a setting interface of the BIOS can be output. At least a part of the setting item data of the setting interface can be from the first application. For example, in the interface displayed by the first application, the selection operation can be performed on the option of setting the BIOS. The first application can output the setting interface of the BIOS, e.g., a setup interface of the BIOS. The setup interface can include a setting item for performing a version update on the BIOS, a setting item for performing version restoration on the BIOS, and a setting item for performing configuration on system time. Based on the selection of the setting item, the version update and restoration function can be performed on the BIOS, and the system time reset function can be performed. The setup interface can further include other setting items of the BIOS, which are not limited by embodiments of the present disclosure.

The setup interface of the BIOS above can be a presentation interface that provides setting item data that can be used to implement the non-core function of the BIOS. The presentation interface providing the setting item data that can be used to realize the core function of the BIOS can also be regarded as the setup interface of the BIOS. The setting item data used to realize the non-core function of the BIOS can be presented through the first application. The setting item data used to realize the core function of the BIOS can be presented through the first application and can also be presented through a BIOS interface of the electronic apparatus. The interface of the first application can represent the setting item data capable of realizing the non-core function of the BIOS and the setting item data capable of realizing the core function of the BIOS. The user can select the setting item data used to realize the non-core function of the BIOS and the setting item data used to realize the core function of the BIOS according to actual needs.

If the user selects the setting item data used to realize the core function of the BIOS in the interface of the first application, the non-core function of the BIOS and the core function of the BIOS can be realized by controlling the first application in embodiments of the present disclosure.

The setting item data used to realize the core function of the BIOS can include but is not limited to, a hardware range requiring power-on self-check and a self-check state of the hardware in the hardware range.

Figure 5:
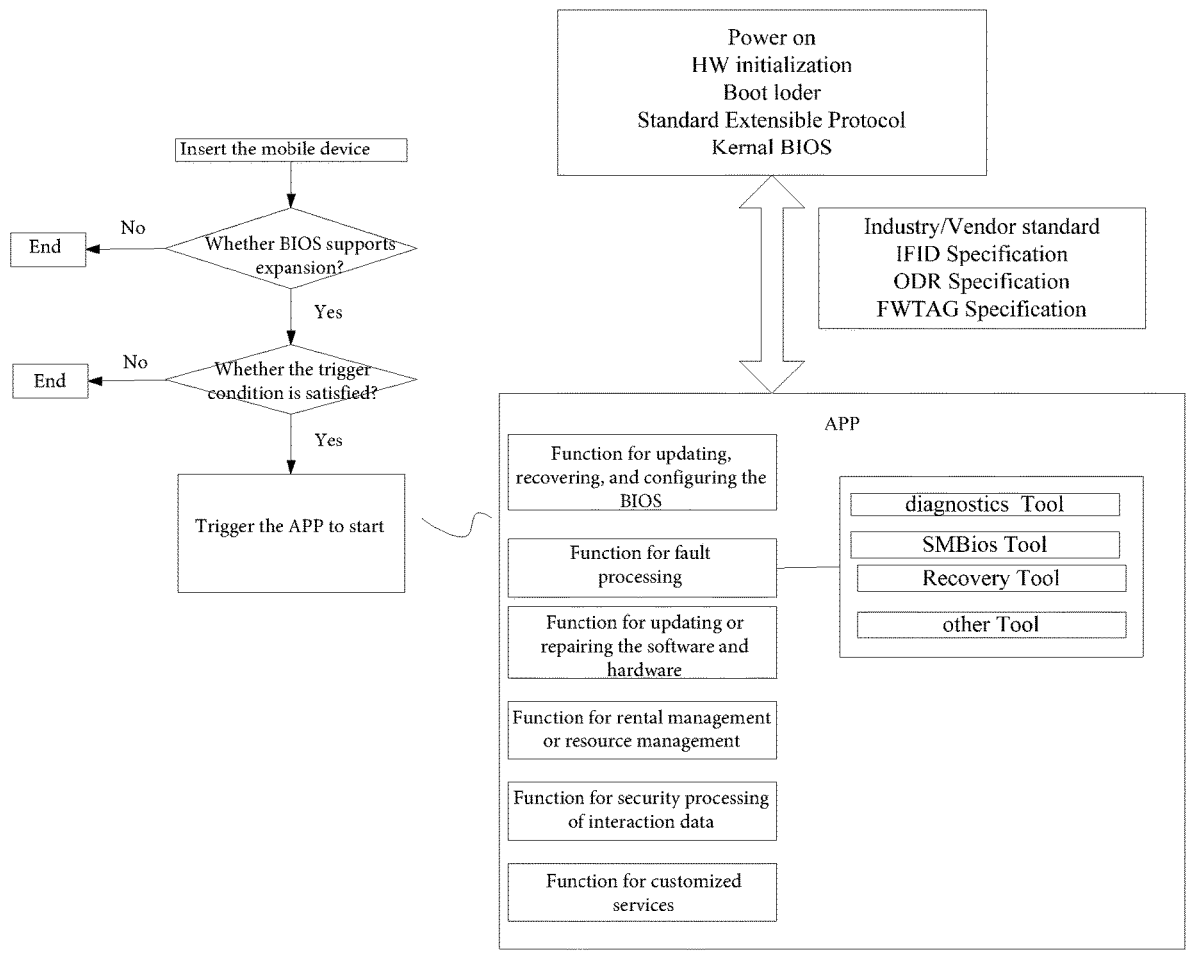
FIG. 5 illustrates a schematic flowchart of a processing method according to some embodiments of the present disclosure.

If the operation is an operation of calling the target tool, the corresponding target tool can be at least started for the user to use. For example, as shown in FIG. 5, in the interface represented by the first application, at least one of a diagnostics tool (diagnostics Tool), a monitoring tool (SMBios Tool), and a recovery tool (Recovery Tool) can be started. Thus, the diagnostic tool can be configured to diagnose the hard drive and memory of the electronic apparatus. The monitoring tool can be configured to monitor the usage of the CPU of the electronic apparatus. The recovery tool can be configured to recover the electronic apparatus from a black screen state to a normal state. In addition, an erase tool can be provided and configured to erase hard drive data. Any appropriate tool is within the scope of the present disclosure.

In some embodiments, the corresponding function can be implemented based on the operation of the option information included in the interface of the first application, and the non-core function of the BIOS can be normally implemented, which improves usability for implementing the non-core function of the BIOS.

In some embodiments, the configuration information of the electronic apparatus can be updated based on the setting information of the setup interface of the BIOS output by the first application.

The configuration information of the electronic apparatus can be any electronic apparatus information that is configured in the BIOS, e.g., the state of the electronic apparatus and the system time. The state of the electronic apparatus can include states S0 to S5. The state S0 can be an operation state of the electronic apparatus. The state S1 can be a POS (PoweronSuspend, the power source being powered on) state of the electronic apparatus. The state S2 can be an operation stop state. The state S4 can be an STD (Suspend-toDisk, the hard drive being powered on) state. The state S5 can be an off state with zero power consumption. When the first application and the BIOS support the above protocol or standard, the state of the electronic apparatus can be set or updated by setting or updating the setting information for the state of the electronic apparatus in the setup interface of the BIOS output by the first application.

The BIOS can be notified with the setting or changing of different states of the electronic apparatus through different transmission channels to synchronously update the setting item in the BIOS. A new method for setting or modifying the setting item of the BIOS can be provided.

The system time of the electronic apparatus can be configured in the BIOS. When the first application and the BIOS support the above protocol or standard, the system time of the electronic apparatus can be set or updated by adding or updating the setting information of the system time of the electronic apparatus for the setup interface of the BIOS output by the first application.

When the BIOS is determined to be able to be expanded, controlling the first application to perform the target operation corresponding to the target request to realize the first function can include providing an interface configured to receive the target operation to realize the corresponding first function based on the target operation obtained through the interface. The interface may belong to or may not belong to the electronic apparatus. The first function can be implemented based on the standard or protocol between the first application and the BIOS and the program assembly included in the BIOS. The electronic apparatus can include an audio input/output interface, an image input/output interface, and a string input/output interface (i.e., a keyboard interface). The user can request through audio, an image, or a keyboard input manner to perform the function of updating, recovering, or configuring the BIOS, perform the fault processing, and perform the non-core function of the BIOS such as updating or repairing the software and hardware. Further, when the trigger condition is satisfied, the first application can be started. Based on the target request generated by the user through the audio, the image, or the keyboard input manner, the electronic apparatus can call the program assembly of the BIOS capable of realizing the first function corresponding to the target request and the program codes corresponding to the target request stored in the mobile device. The electronic apparatus can realize the non-core function requested by the user using the program assembly to run the program codes.

The electronic apparatus can also use an audio input/output interface, an image input/output interface, or a string input/output interface of another electronic apparatus as the interface of the electronic apparatus. The target request generated by the user through an interface of another electronic apparatus in an audio, image, and keyboard input mode can be received. For example, the target request for upgrading software and hardware of the electronic apparatus can be input through the audio input mode or the keyboard input mode. Based on the target request, the corresponding target operation can be generated. The electronic apparatus can call the program assembly of the BIOS of the first function corresponding to the target request and the program codes corresponding to the target request stored in the mobile device. The electronic apparatus can realize the non-core function requested by the user using the program assembly to run the program codes.

In some embodiments, the target operation can be obtained based on the interface of the electronic apparatus or another electronic apparatus that can be reused by the electronic apparatus. The electronic apparatus can further implement the non-core function of the BIOS. New technical support can be provided to implement the non-core function of the BIOS.

When the keyboard interface is started, the keyboard can be set to have different light-emitting effects. The interface of the first application can provide setting item data used to set or update a light-emitting effect of the keyboard. Based on the setting item data represented by the interface of the first application, different light-emitting effects can be selected for the keyboard by setting or updating the setting item data by the user. Further, different buttons of the keyboard can have different light-emitting effects for selection. The interface of the first application can provide the setting item data used to set or update the light-emitting effects of the buttons. The different light-emitting effects of the buttons can be selected according to the setting or updating of the setting item data performed by the user on the light-emitting effects of the buttons. The user experience is improved.

In some embodiments, controlling the first application to perform the target operation corresponding to the target request to implement the first function can include, if the mobile device accessing the electronic apparatus is determined to include an interface configured to receive the target operation, obtaining the target operation through the interface of the mobile device to implement the corresponding first function. That is, when the mobile device connected to the electronic apparatus includes the audio input/output interface, the image input/output interface, and the string input/output interface capable of receiving a target operation, the user can input the first function that the user wants to implement in the audio, image, or keyboard input manner. For example, the target request for upgrading the software and hardware of the electronic apparatus can be input in the audio input or keyboard input manner. Based on the target request, the target operation for upgrading the software and the hardware can be generated to implement the function of upgrading the software and the hardware of the electronic apparatus.

In some embodiments, the target operation can be obtained based on the interface of the mobile device accessing the electronic apparatus to implement the non-core function of the BIOS. New technical support can be provided for implementing the non-core function of the BIOS.

The technical solution of the present disclosure can be further explained in connection with FIG. 5.

In the application scenario shown in FIG. 5, the first Application (APP) is installed in the mobile device. The first data used to implement the non-core function of the BIOS is stored in the mobile device. The second data used to implement the core function of the BIOS is stored in the electronic apparatus. The first application can be an APP that conforms to a unified extensible firmware interface (UEFI) specification. As shown in FIG. 5, the APP and the BIOS of the electronic apparatus can support the UEFI specification or protocol (an extensible protocol, such as a Standard Extensible Protocol). Based on the UEFI specification or protocol, the APP can run in the BIOS environment. The BIOS can have an extensible attribute (the BIOS being extensible).

As shown in FIG. 5, after the electronic apparatus is powered on, the BIOS of the electronic apparatus can be powered on (Power on), and perform hardware self-check and initialization (HW initialization), boot program loading (boot loader), and hardware status reporting until the initialization is completed. Then, the electronic apparatus can be switched from the BIOS to the operating system of the electronic apparatus.

In some embodiments, the non-core function of the BIOS may need to be set or changed. The electronic apparatus may need to enter the BIOS system. In the setup interface of the BIOS system, the non-core function of the BIOS can be set or changed. The ROM of the electronic apparatus may need to store the program codes used to implement the core function of the BIOS and the program codes used to implement the non-core function, which increases the burden of the storage resource.

In the application scenario, the program codes used to implement the core function of the BIOS can be still stored in the ROM of the electronic apparatus, and the program codes used to implement the non-core function of the BIOS can be moved outside of the electronic apparatus. For example, the program codes used to implement the non-core function of the BIOS can be stored in the mobile device to reduce the occupation of the storage resource of the electronic apparatus. After the program codes used to implement the non-core function of the BIOS are moved to or stored outside of the electronic apparatus, the following processes can be performed to set or change the non-core function of the BIOS.

When the electronic apparatus is powered on, the mobile device can access or be inserted into the electronic apparatus. Whether the BIOS of the electronic apparatus supports expansion can be detected, and if the BIOS does not support the expansion, the process ends. If the BIOS supports the expansion, the following processes can be continued. Since the mobile device is provided with an encryption password, the electronic apparatus may need to decrypt the mobile device. When the decryption succeeds, the initialization operation of the connected mobile device can be considered to be completed. In response to completing the initialization operation on the connected mobile device, the electronic apparatus can determine that the trigger condition for triggering the APP to start is satisfied. The APP can be triggered to start. The APP can be guided to the BIOS environment of the electronic apparatus using the boot program of the electronic apparatus to control the APP to run in the BIOS environment of the electronic apparatus. The APP can run in the BIOS environment because the APP and the BIOS can support the protocol or specification such as industry/Vendor standard and IFID specification.

The APP running in the BIOS environment can output the interface used for the user to select different non-core functions. The interface can include a plurality of options, such as an option for updating, recovering, or configuring the BIOS, an option for fault processing, an option for upgrading software and hardware, an option for rental management or resource management, an option for data security processing, and an option for providing customized services.

The user can select a needed option according to actual conditions. The user can enter a request to select the option for updating the BIOS to the interface by inputting an audio of "Please select BIOS update option" or in the keyboard input manner, such as the keyboard.

For example, the option for updating the BIOS can be taken as an example. The selection operation can be regarded as a target request. Based on the target request, the electronic apparatus can call the BIOS program assembly configured to implement the function of updating the BIOS version of the electronic apparatus and program codes used to implement the function of updating the BIOS version and stored in the mobile device. The program codes can be run by the program assembly to implement the non-core function requested by the user. The BIOS program assembly can be provided by a BIOS core (Kernal BIOS).

For example, selecting the option for configuring the BIOS can be taken as an example. The selection operation can be regarded as a target request. Based on the target request, the electronic apparatus can call the BIOS program assembly configured to implement the function of the option for configuring the BIOS of the electronic apparatus and the program codes used to implement the function of the option for configuring the BIOS stored in the mobile device. The program codes can be run by the program assembly to implement the non-core function requested by the user.

For example, selecting the option for upgrading the software and hardware can be taken as an example. If a file of a to-be-updated application is selected, the selection operation can be regarded as a target request. Based on the target request, the electronic apparatus can call the BIOS program assembly configured to implement the function for downloading the application of the electronic apparatus and the program codes used to implement the function for downloading the application stored in the mobile device. The program codes can be run by the program assembly to implement the non-core function requested by the user.

In embodiments of the present disclosure, by separately storing the second data used to implement the core function of the BIOS and the first data used to implement the non-core function in two apparatuses, the first data and the second data can be independent of each other and may not have mutual influence. By removing the first data used to implement the non-core function of the BIOS from the BIOS storage space and storing the first data at another storage location, the occupation of the BIOS storage space can be greatly reduced.

In addition, when the first data used to implement the non-core function of the BIOS is stored in another storage location, the non-core function of the BIOS can be implemented by controlling the APP running in the BIOS environment. Thus, the normal application of the non-core function of the BIOS cannot be influenced. In embodiments of the present disclosure, technical support can be provided to normally implement the non-core function of the BIOS.

The technical solution of the present disclosure can further have the following advantages.

1) The occupation of the BIOS storage space is greatly reduced. Thus, a relatively small ROM is provided at the motherboard of the electronic apparatus to store core codes of the BIOS, which effectively reduces hardware costs.

2) More non-core functions of the BIOS are able to be expanded. Because the program codes used to implement the non-core function are stored in another storage location, the program codes used to implement the non-core function are not limited by capacity or space. The codes can run smoothly.

3) More security functions and customized functions are provided for the user using the first application, which is flexible. The mobile device is flexibly selected, which avoids the high cost caused by purchasing the mobile device.

4) The APP is able to run in the BIOS environment. The APP is able to run in the BIOS environment without relying on the operating system. Based on the APP running in the BIOS environment, the non-core function of the BIOS can be implemented normally and smoothly.

5) Because the APP and the BIOS support the communication protocol in the industry, the technical solution of the present disclosure can be universal and broadly transplanted and used. The BIOS function is able to be efficiently developed, which generates a good economic benefit.

Figure 6:
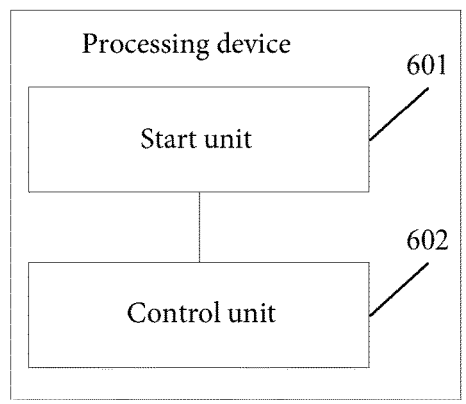
FIG. 6 illustrates a schematic structural diagram of a processing device according to some embodiments of the present disclosure.

The present disclosure also provides a processing device. As shown in FIG. 6, the device includes a start unit 601 and a control unit 602.

The start unit 601 can be configured to start the first application in response to the trigger condition being satisfied. The first application can be an application running in the Pre-OS environment.

The control unit 602 can be configured to control the first application to perform the target operation corresponding to the target request to implement the first function that is different from the second function. The second function can at least include a function for initializing the Pre-OS environment.

The first data used to implement the first function and the second data used to implement the second function can be stored in different locations.

In some embodiments, the device further includes a determination unit configured to determine that the trigger condition is satisfied in response to completing the initialization operation on the mobile device, determine that the trigger condition is satisfied in response to completing the initialization operation on the storage component where the first application is installed, or determine that the trigger condition is satisfied in response to obtaining at least one target request. The target request can be used to implement the first function that is different from the second function.

In some embodiments, the target request includes at least one of the request for updating, recovering, or configuring the BIOS of the electronic apparatus, the request for the fault processing of the electronic apparatus, the request for updating or repairing the software and hardware of the electronic apparatus, the request for the rental management or resource management of the electronic apparatus, the request for performing the security processing on the interaction data of the electronic apparatus, or the request for the electronic apparatus to output the customized service.

In some embodiments, the device further includes a verification unit configured to verify the expansion attribute of the BIOS of the electronic apparatus.

The control unit 602 can be configured to, if the BIOS is able to be expanded, control the first application to perform the corresponding target operation to implement the first function, and, if the BIOS is not able to be expanded, control the first application to perform the corresponding target operation to implement a third function. The third function can be implemented independently of the BIOS.

In some embodiments, the control unit 602 can be configured to display interface information of the first application. The interface information can include option information used to implement different functions. The control unit 602 can be configured to perform the corresponding first function based on the operation of the option information. The first function can be implemented based on the standard or protocol between the first application and the BIOS and the program assembly included in the BIOS.

In some embodiments, the control unit 602 can be configured to, when the BIOS is determined to be expandable, provide the interface configured to receive the target operation to implement the corresponding first function based on the target operation obtained through the interface. The interface can belong to or not belong to the electronic apparatus. The first function can be implemented based on the standard or the protocol between the first application and the BIOS and the program assembly included in BIOS.

In some embodiments, the control unit 602 can be configured to, if the mobile device connected to the electronic apparatus is determined to include the interface configured to receive the target operation, obtain the target operation through the interface of the mobile device to implement the corresponding first function.

In some embodiments, the control unit 602 can be configured to, if the operation is an operation for a file option, perform the functional operation of downloading or upgrading at least one of an application, firmware, or a driver, and, if the operation is the operation for the resource management option or the rental management option of the electronic apparatus, at least output the interface information used to implement the resource management or rental management. The control unit 602 can be further configured to, if the operation is an operation for triggering the setting of the BIOS, at least output the setup interface of the BIOS. The at least a part of setting item data of the setup interface can be from the first application. The control unit 602 can be further configured to, if the operation is an operation for calling the target tool, at least start the corresponding target tool for the user to use.

In some embodiments, the control unit 602 can be configured to update the configuration information of the electronic apparatus based on the setting information for the setup interface of the BIOS output by the first application.

In the processing device of embodiments of the present disclosure, since the principle of the processing device for solving the problem can be similar to the principle of the processing method, an implementation process, an implementation principle, and a beneficial effect of the processing device can refer to the description of the implementation process and the implementation principle of the above method, which are not repeated here.

According to embodiments of the present disclosure, the present disclosure further provides an electronic apparatus and a readable storage medium.

Figure 7:
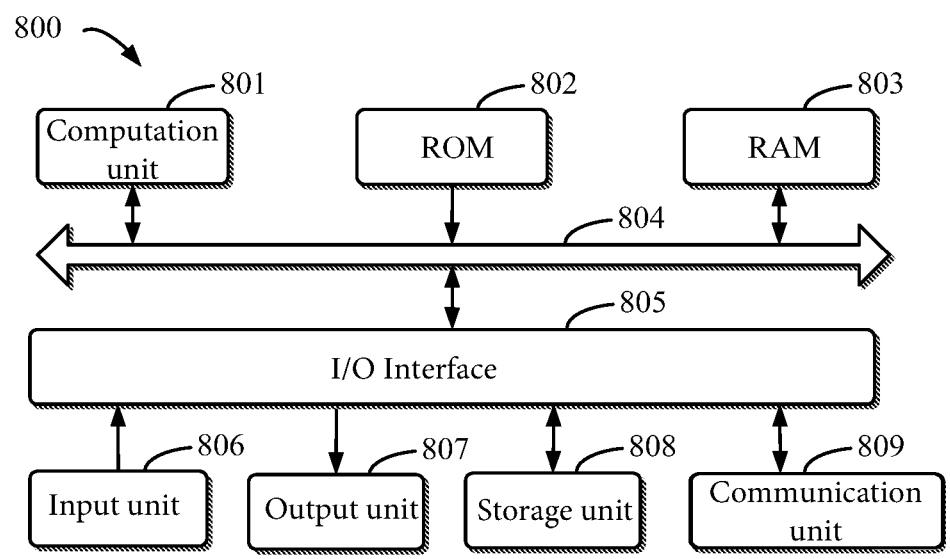
FIG. 7 illustrates a schematic structural diagram of an electronic apparatus according to some embodiments of the present disclosure.

FIG. 7 illustrates a schematic structural diagram of an electronic apparatus 800 according to some embodiments of the present disclosure. The electronic apparatus can include various forms of digital computers, such as laptops, desktops, workstations, personal digital assistants, servers, blade servers, large computers, and other appropriate computers. The electronic apparatus can also include various forms of mobile devices, such as personal digital processing devices, cell phones, smartphones, wearable apparatuses, and other similar computation devices. In embodiments of the present disclosure, members, connections and relationships of the members, and functions of the members are merely exemplary and are not intended to limit the present disclosure.

As shown in FIG. 7, the electronic apparatus 800 includes a computation unit 801. The computation unit 801 can be configured to perform various appropriate actions and processes according to the computer program stored in the ROM or the computer program loaded in the RAM from the storage unit 808. In RAM 803, various programs and data required by the operation of the apparatus 800 can be stored. The computation unit 801, ROM 802, and RAM 803 can be connected to each other through a bus 804. An input/output (I/O) interface 805 is also connected to the bus 804.

A plurality of members of the apparatus 800 can be connected to the I/O interface 805. The plurality of members includes an input unit 806, such as a keyboard and a mouse, an output unit 807, such as various types of displays and speakers, a storage unit 808, such as a magnetic disk and an optical disk, and a communication unit 809, such as a network card, a modem, a wireless communication transceiver. The communication unit 809 can be configured to allow the apparatus 800 to exchange information/data with other apparatuses via a computer network such as the internet and/or various telecommunication networks.

The computation unit 801 can be various general and/or special purpose processing assemblies with processing and computation capabilities. Some examples of the computation unit 801 can include, but are not limited to, a central processing unit (CPU), a graphics processing unit (GPU), various dedicated Artificial Intelligence (AI) computation chips, various computation units running machine learning model algorithms, a Digital Signal Processor (DSP), and any appropriate processor, controller, and microcontroller. The calculation unit 801 can be configured to perform the methods and processes described above, such as the processing method. For example, in some embodiments, the processing method can be implemented as a computer software program, which is embodied in a computer-readable medium, such as the storage unit 808. In some embodiments, a part or all of the computer program can be loaded and/or installed onto the apparatus 800 through the ROM 802 and/or the communications unit 809. When the computer program is loaded into the RAM 803 and executed by computation unit 801, one or more processes of the processing method can be performed. In some other embodiments, the computation unit 801 can be configured to perform the processing method in any other suitable manner (e.g., through firmware).

Various implementations of the systems and techniques described here above can be implemented in a digital electronic circuit system, an integrated circuit system, a field programmable gate array (FPGA), an application-specific integrated circuit (ASIC), an application-specific standard product (ASSP), a system on a chip (SOC), a complex programmable logic device (CPLD), hardware, firmware, and software of the computer, and/or a combination thereof. The various embodiments can be implemented in one or more computer programs. The one or more computer programs can be performed and/or explained in the programmable system including at least one programmable processor. The programmable processor can include a dedicated or general-purpose programmable processor, which can receive data and instructions from the storage system, at least one input device, and at least one output device, and transmit the data and the instruction to the storage system, the at least one input device, and the at least one output device.

The program codes used to implement the method of the present disclosure can be written in any combination of one or more programming languages. These program codes can be provided to a processor or controller of a general-purpose computer, special-purpose computer, or another programmable data processing device. Thus, when the program codes are executed by the processor or controller, the functions/operations specified in the flowchart and/or the block diagram can be implemented. The program codes can be entirely or partially executed on the machine. The program codes can be executed partially on the machine and partially on a remote machine as an individual software package, or entirely on a remote machine or server.

In the context of the present disclosure, the computer-readable medium can be a tangible medium that includes or stores the program for the instruction execution system, device, or apparatus to use or used in connection with the instruction execution system, device, or apparatus. The computer-readable medium can be a computer-readable signal medium or store a computer-readable storage medium. The computer-readable storage medium can include but is not limited to an electronic, magnetic, optical, electromagnetic, infrared, or semiconductor system, device, or apparatus, or a combination thereof. For example, the computer-readable storage medium can further include an electrical connection based on one or more wires, a portable computer disc, a hard drive, a random access memory (RAM), a read-only memory (ROM), an erasable programmable read-only memory (EPROM or flash memory), an optical fiber, a compact disc read-only memory (CD-ROM), an optical storage device, a magnetic storage device, or a combination thereof.

To provide interaction with the user, the systems and techniques described here can be implemented on the computer. The computer can include a display device (e.g., a cathode ray tube (CRT) or liquid crystal display (LCD) monitor) configured to display information to the user, and a keyboard and a pointing device (e.g., a mouse or a trackball). The user can provide an input to the computer through the keyboard and the pointing device. Other devices can also be configured to provide interaction with the user. For example, the feedback for the user can be any type of sensory feedback (e.g., visual feedback, auditory feedback, or tactile feedback). The input received from the user can be in any form, including acoustic, speech, or tactile input.

The systems and techniques described here can be implemented in a computation system (e.g., a data server) that includes a back-end member, or a computation system (e.g., an application server) that includes a middleware member, or a computation system (e.g., a personal computer including a graphical user interface or a web browser, the user being able to interact with the system and the technique described here through the graphical user interface or the web browser), or a computation system including a combination of the back-end member, the middleware member, or the front-end member. The members of the system can be interconnected by any form or medium of digital data communication (e.g., a communication network). For example, the communication network can include a local area network (LAN), a wide area network (WAN), and the Internet.

The computer system may include a client terminal and a server. The client terminal and the server can be generally away from each other and typically interact with each other through the communication network. The client-server relationship can be generated by running the client terminal and the server at corresponding computers with the computer programs having the client-server relationship. The server can be a cloud server, a server of a distributed system, or a server combining a blockchain.

The above are merely some embodiments of the present disclosure. The scope of the present disclosure is not limited to this. Those skilled in the art can easily think of variations or replacements within the scope of the present disclosure. These variations or replacements should be within the scope of the present disclosure.

What is claimed is:

1. A processing method, comprising:
   responding to a trigger condition being satisfied, and starting a first application, the first application running in a pre-operating system environment; and
   controlling the first application to perform a target operation corresponding to a target request to implement a first function different from a second function, the second function including a function for initializing the pre-operating system environment;
   wherein, data for implementing the first function and the second function is stored in different storage locations.

2. The method of claim 1, wherein responding to the trigger condition being satisfied includes at least one of:
   responding to completing an initialization operation of an connected mobile device, and determining that the trigger condition is satisfied;
   responding to completing an initialization operation of a storage component where the first application is stored, and determining that the trigger condition is satisfied; or
   responding to obtaining at least one target request, and determining that the trigger condition is satisfied, the target request being able to implement the first function that is different from the second function.

3. The method of claim 2, wherein the target request includes at least one of:
   a request for updating, recovering, or configuring a BIOS of an electronic apparatus;
   a request for fault processing of the electronic apparatus;
   a request for updating or repairing software and hardware of the electronic apparatus;
   a request for rental management or resource management of the electronic apparatus;
   a request for performing security processing on interaction data of the electronic apparatus; or
   a request for outputting a customized service by the electronic apparatus.

4. The method of claim 1, further comprising:
   checking an expansion attribute of a basic input and output system (BIOS) of the electronic apparatus;
   in response to the BIOS being able to be expanded, controlling the first application to execute a corresponding target operation to implement the first function; and
   in response to the BIOS being not able to be expanded, controlling the first application to execute the corresponding target operation to implement a third function, the third function being implemented independent of the BIOS.

5. The method of claim 1, wherein controlling the first application to perform the target operation corresponding to the target request to implement the first function includes:
   displaying interface information of the first application, the interface information including option information used to implement different functions; and
   performing the corresponding first function based on an operation for the option information, the first function being implemented based on a standard or a protocol between the first application and a BIOS and a program assembly included in the BIOS.

6. The method of claim 1, wherein controlling the first application to perform the target operation corresponding to the target request to implement the first function includes:
   in response to the BIOS being able to be expanded, providing an interface configured to receive the target operation to implement the corresponding first function based on the target operation obtained through the interface, the interface belonging to or not belonging to the electronic apparatus, and the first function being implemented based on a standard or protocol between the first application and the BIOS and a program assembly included in the BIOS.

7. The method of claim 1, wherein controlling the first application to perform the target operation corresponding to the target request to implement the first function includes:
   in response to determining that a mobile device connected to the electronic apparatus includes an interface configured to receive the target operation, obtaining the target operation through the interface of the mobile device to implement the corresponding first function.

8. The method of claim 5, wherein performing the corresponding first function based on an operation of option information includes at least one of:
in response to the operation being an operation for a file option, performing a functional operation of downloading or upgrading at least one of an application, firmware, or a driver;
in response to the operation being an operation of an resource management option or a rental management option of the electronic apparatus, outputting interface information used to perform resource management or rental management;
in response to the operation being an operation for triggering a BIOS, outputting a setup interface of the BIOS, at least a part of setting item data of the setup interface being from the first application; or
in response to the operation being an operation of calling a target tool, starting the corresponding target tool for use.

9. The method of claim 8, further comprising:
updating configuration information of the electronic apparatus based on the setting information of the setup interface of the BIOS output by the first application.

10. A processing device, comprising:
a start unit configured to respond to satisfying a trigger condition and start a first application, the first application being an application running in a pre-operation system environment; and
a control unit configured to control the first application to perform a target operation corresponding to a target request to implement a first function different from a second function, the second function including a function of initializing the pre-operating system environment;
wherein data used to implement the first function and the second function is stored in different locations.

11. The device of claim 10, wherein the start unit is further configured to:
respond to completing an initialization operation of an connected mobile device to determine that the trigger condition is satisfied;
responding to completing an initialization operation of a storage component where the first application is stored to determine that the trigger condition is satisfied; or
responding to obtaining at least one target request to determine that the trigger condition is satisfied, the target request being able to implement the first function that is different from the second function.

12. An electronic apparatus, comprising:
a processor; and
a memory storing a computer program that, when executed by the processor, causes the processor to:
respond to a trigger condition being satisfied and start a first application, the first application running in a pre-operating system environment; and
control the first application to perform a target operation corresponding to a target request to implement a first function different from a second function, the second function including a function for initializing the pre-operating system environment;
wherein data used to implement the first function and the second function is stored in different storage locations.

13. The apparatus of claim 12, wherein the processor is configured to:
respond to completing an initialization operation of an connected mobile device and determine that the trigger condition is satisfied;
respond to completing an initialization operation of a storage component where the first application is stored and determine that the trigger condition is satisfied; or
respond to obtaining at least one target request and determine that the trigger condition is satisfied, the target request being able to implement the first function that is different from the second function.

14. The apparatus of claim 13, wherein the target request includes at least one of:
a request for updating, recovering, or configuring a BIOS of an electronic apparatus;
a request for fault processing of the electronic apparatus;
a request for updating or repairing software and hardware of the electronic apparatus;
a request for rental management or resource management of the electronic apparatus;
a request for performing security processing on interaction data of the electronic apparatus; or
a request for outputting a customized service by the electronic apparatus.

15. The apparatus of claim 12, wherein the processor is configured to:
check an expansion attribute of a BIOS of the electronic apparatus;
in response to the BIOS being able to be expanded, control the first application to execute a corresponding target operation to implement the first function; and
in response to the BIOS being not able to be expanded, control the first application to execute the corresponding target operation to implement a third function, the third function being implemented independent of the BIOS.

16. The apparatus of claim 12, wherein the processor is configured to:
display interface information of the first application, the interface information including option information used to implement different functions; and
perform the corresponding first function based on an operation for the option information, the first function being implemented based on a standard or a protocol between the first application and a BIOS and a program assembly included in the BIOS.

17. The apparatus of claim 12, wherein the processor is configured to:
in response to the BIOS being not able to be expanded, provide an interface configured to receive the target operation to implement the corresponding first function based on the target operation obtained through the interface, the interface belonging to or not belonging to the electronic apparatus, and the first function being implemented based on a standard or protocol between the first application and the BIOS and a program assembly included in the BIOS.

18. The apparatus of claim 12, wherein the processor is configured to:
in response to determining that a mobile device connected to the electronic apparatus includes an interface configured to receive the target operation, obtain the target operation through the interface of the mobile device to implement the corresponding first function.

19. The apparatus of claim 16, wherein the processor is configured to:

in response to the operation being an operation for a file option, perform a functional operation of downloading or upgrading at least one of an application, firmware, or a driver;

in response to the operation being an operation of an resource management option or a rental management option of the electronic apparatus, output interface information used to perform resource management or rental management;

in response to the operation being an operation for triggering a BIOS, output a setup interface of the BIOS, at least a part of setting item data of the setup interface being from the first application; or in response to the operation being an operation of calling a target tool, start the corresponding target tool for use.

20. The apparatus of claim 19, wherein the processor is configured to:

update configuration information of the electronic apparatus based on the setting information of the setup interface of the BIOS output by the first application.

* * * * *